Aug. 9, 1932.  W. E. VAN DORN  1,870,537
FRICTION SHOCK ABSORBING MECHANISM
Filed Jan. 31, 1930
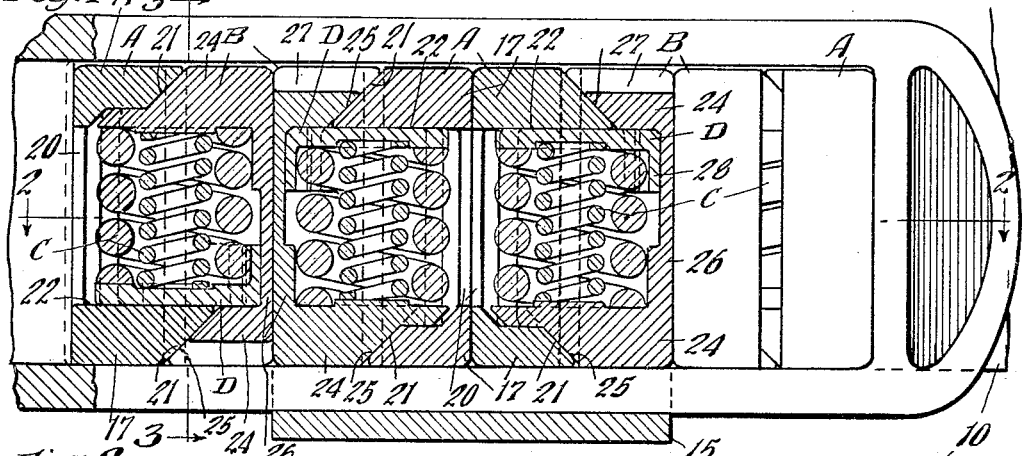
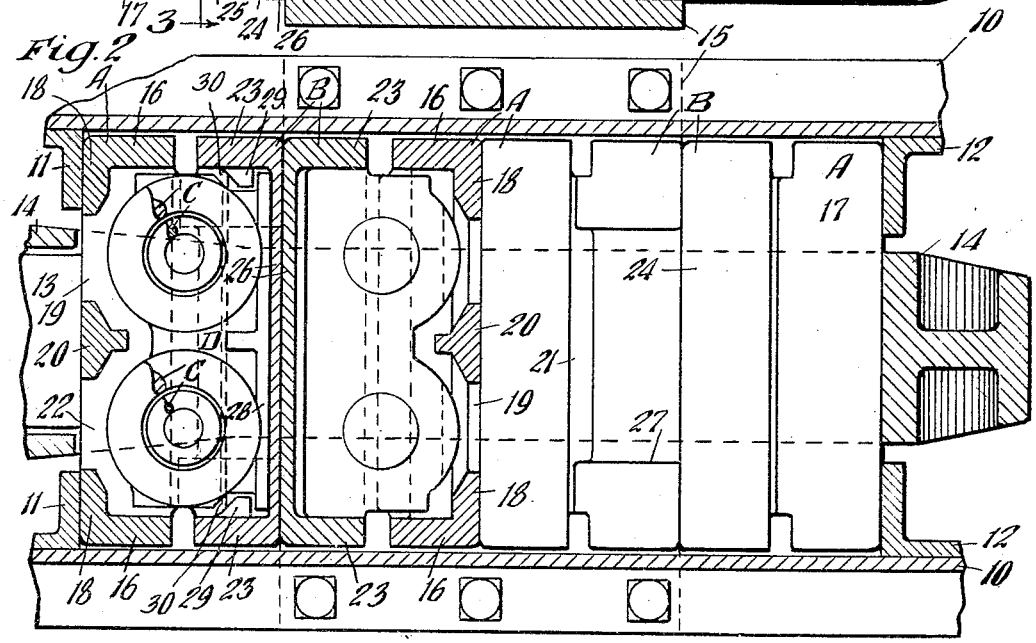
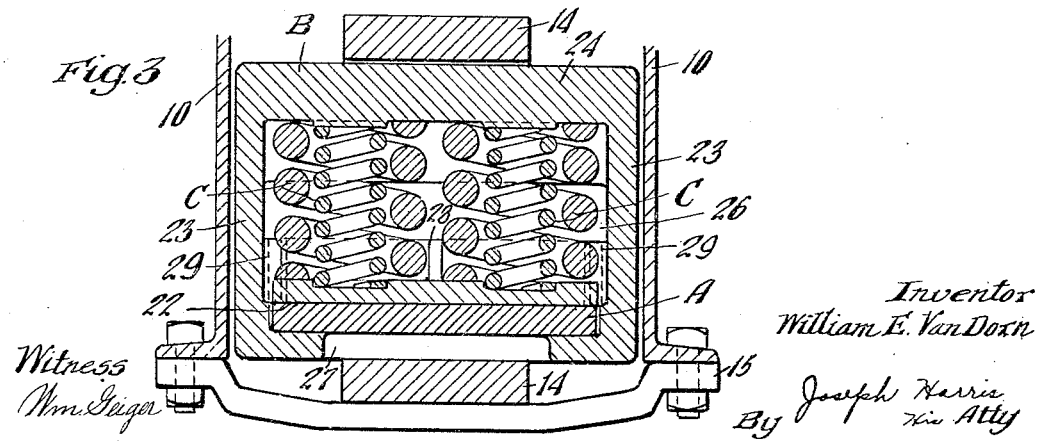
Inventor
William E. Van Dorn
By Joseph Harris
His Atty
Witness
Wm. Geiger Patented Aug. 9, 1932

1,870,537

UNITED STATES PATENT OFFICE

WILLIAM E. VAN DORN, OF ALTADENA, CALIFORNIA, ASSIGNOR TO W. H. MINER, INC., OF CHICAGO, ILLINOIS, A CORPORATION OF DELAWARE

FRICTION SHOCK ABSORBING MECHANISM

Application filed January 31, 1930. Serial No. 425,029.

This invention relates to improvements in friction shock absorbing mechanisms.

One object of the invention is to provide a high capacity friction shock absorbing mechanism especially adapted for railway draft riggings, wherein the high capacity is provided through a plurality of laterally movable, spring resisted friction elements having frictional engagement with each other, and yoke means enclosing said elements for holding certain of the same against transverse movement and permitting lateral or transverse movement of the remaining elements to provide the frictional resistance.

A further object of the invention is to provide a mechanism of the character described in the preceding paragraph including cooperating wedge means on certain of said elements for effecting relative movement of the same.

Another object of the invention is to provide a friction shock absorbing mechanism having high capacity, wherein relatively great frictional resistance is obtained by the provision of a plurality of relatively movable friction elements, having their movement opposed by spring means, wherein the friction elements are arranged in pairs, the members of each pair being transversely disposed and having wedging engagement with each other and the members of adjacent pairs having sliding frictional engagement with each other along transverse friction surfaces and certain members of said pairs having longitudinally disposed friction surfaces cooperating with spring seats held in frictional contact with said surfaces by the action of the spring resistance means.

Other objects of the invention will more clearly appear from the description and claims hereinafter following.

In the drawing, forming a part of this specification, Figure 1 is a part side elevational view and part longitudinal, sectional view through a portion of the underframe structure of a railway car, illustrating my improvements in connection therewith. Figure 2 is a part longitudinal, sectional view and part top plan view of my improved shock absorbing mechanism, the sectional view corresponding substantially to the line 2—2 of Figure 1. And Figure 3 is a vertical, transverse, sectional view, corresponding substantially to the line 3—3 of Figure 1.

In said drawings, 10—10 designate channel-shaped center or draft sills of a railway car underframe to the inner sides of which are secured front stop lugs 11—11 and rear stop lugs 12—12. The inner end of the coupler shank is designated by 13 and a yoke 14 of well known form is operatively connected to the coupler in the usual manner and the yoke is supported by a detachable saddle plate 15 secured to the bottom flanges of the draft sills. My improved shock absorbing mechanism is disposed within the yoke and cooperates directly with the inner end of the coupler shank, the rear end of the yoke and the front and rear stop lugs of the draft sills.

My improved shock absorbing mechanism proper comprises broadly a plurality of cooperating similar friction units, each unit including two relatively movable friction elements A and B; a transversely disposed spring resistance C; and a combined spring cap and friction plate D.

In carrying out my invention, I preferably provide four friction units each comprising the friction elements A and B. The friction units as shown in the present instance are preferably four in number and are arranged in pairs at opposite ends of the mechanism, the members of each pair being reversely arranged, as shown in Figure 1.

The element A of each friction unit is in the form of a casing having vertically disposed, relatively heavy side walls 16—16; spaced, transversely disposed, relatively heavy top and bottom walls 17—17, and relatively short, transverse, opposed end walls 18—18 having an opening 19 therebetween. The end portion of the casing is suitably reinforced by a vertical web 20 connecting the top and bottom walls centrally of the opening 19. The inner edges of the top and bottom walls 17—17 are provided with transversely disposed parallel wedge faces 21—21, as clearly shown in Figure 1. As illustrated in Figure 1, the bottom wall 17 of the element A of the outermost unit is relatively longer than the top wall 17 thereof and has a longitudinally disposed, interior flat friction surface 22 for a purpose hereinafter pointed out. As hereinbefore mentioned, the units of each pair are reversely arranged, in other words, the second unit is reversely arranged to the unit just described and the member A thereof has the wall 17 at the top end thereof of greater length than the wall 17 at the lower end and said top wall is provided with an interior, longitudinally disposed, friction surface which corresponds to the friction surface 22 hereinbefore described and is also indicated by 22.

The friction element B of each unit has spaced, vertically disposed side walls 23—23; horizontally disposed, spaced top and bottom walls 24—24, and a transverse connecting end wall 26. The top and bottom walls of each element B have wedge faces at the free ends thereof corresponding in inclination to the wedge faces 21—21 of the cooperating element A and in wedging engagement therewith, these wedge faces being designated by 25—25. As shown in Figure 1, the front unit has the top wall 24 thereof of greater length than the bottom wall and has a portion thereof extending beyond the wedge face 25 and engaging the inner side of the corresponding wall 17 of the friction element A. As hereinbefore pointed out, the adjacent friction unit comprising the elements A and B is reversely disposed to the front unit and the member B thereof has the longer wall 24 at the bottom side thereof. Each member B has one of the walls 24 thereof cut away centrally, as indicated at 27, the cut away portion being in the form of a slot of such a width as to clear the corresponding arm of the yoke 14. As will be clear, upon reference to Figure 1, the outer unit has the cut away portion of the member B at the bottom thereof, while the second unit has said cut away portion at the top thereof. The third unit corresponds to the second unit and the fourth or last unit at the inner ends of the yoke corresponds to the first unit.

The combined friction plate and spring cap D is in the form of a substantially rectangular, plate-like member having a right angular, transversely extending flange 28, which normally bears on the end wall 26 of the member B. As shown in Figure 1, the end wall 26 is cut away on the inner side to accommodate the flange 28 for sliding movement so as to permit relative approach of the combined spring follower and friction plate D and the opposed wall portion 24 of the member B. In order to hold the spring follower adjacent to the end wall 26 of the member B, the latter is provided with a pair of inwardly projecting, opposed guide ribs 29—29 on the inner sides of the side walls 23—23 thereof. The guide ribs 29—29 engage within suitable guide openings 30—30 provided at opposite ends of the plate D.

Each spring resistance C comprises two members each consisting of an inner and an outer coil interposed between the combined spring cap and friction plate D and the opposed wall 24 of the member B. As will be evident, the spring resistance C thus yieldingly opposes relative separation of the friction elements A and B of each unit. The combined friction plate and spring cap bears directly on the friction surface 22 of the element A of each unit, and as will be evident, relative sliding movement between the friction plate and the element A is had, during compression of the mechanism and relative sliding movement of the wedge faces of the members A and B on each other, thereby effecting relative sliding movement of the friction surface 22 and the plate D. In addition, friction is created by sliding movement of the cap on the end wall 26 of the member B. In order to hold the spring units of each friction unit in position, the cap D is provided with a socket for the corresponding end of the inner coil, and the opposed wall of the member B is provided with a boss engaging within the corresponding end of the outer coil. The angular flange portion 28 of each spring cap D is provided with an interior, vertically disposed, central reinforcing rib disposed between the two spring units and the connecting web of the element A of each unit is also provided with a vertically disposed, interior, reinforcing rib located between the two spring units at the opposite side thereof.

The operation of my improved friction shock absorbing mechanism during inward or buffing movement of the drawbar is as follows: The element A of the outermost friction unit will be forced rearwardly against the cooperating element B, thereby wedging the same laterally downwardly as viewed in Figure 1, and compressing the spring resistance against the spring cap D. Due to the relative approach of the elements A and B, the friction surface 22 of the element A will slide on the spring cap D, thereby producing additional frictional resistance. Inasmuch as the second unit is arranged reversely to the outer unit, inward movement of the outer unit, due to the compression of the mechanism will effect rearward movement of the element B of the second unit, thereby wedging the same laterally upwardly through the action of the cooperating wedge faces of the members B and A of this unit, the member A being held against transverse movement by the yoke arms. As will be evident, the members B—B of the first and second friction units thus move transversely in reverse directions and frictional resistance is created between their engaging surfaces. The third and fourth friction units being similarly arranged to the first and second units, action thereof is precisely the same as that of the units just described, the members B—B of said third and fourth units moving reversely transversely of the mechanism, and having friction engagement with each other. The rearmost unit is held against movement during inward movement of the drawbar by the stop lugs 12.

During a draft action, the operation will be similar to that just described, with the exception that the yoke will pull the rearmost element A of the fourth unit forwardly, compressing the remaining units against the front stop lugs 11. Full compression of the mechanism will be limited by engagement of the side walls 16—16 and 23—23 of each unit with the corresponding arms of the yoke. Release of the mechanism is effected by expansion of the spring resistance elements C forcing the elements A and B of each unit apart. Through the wedging action between the units A and B, the same will be restored to the normal position shown in Figure 1.

From the preceding description taken in connection with the drawing, it will be evident that I have provided a friction shock absorbing mechanism of exceptionally high capacity, due to the arrangement of the cooperating friction surfaces between the different friction elements and the additional friction had by the sliding movement of the spring caps and the friction elements.

Further, by the arrangement of friction units and spring resistance means, all available space between the draft sills of the car allotted to the shock absorbing mechanism is fully made use of, thereby obtaining maximum capacity. A decided advantage is also obtained by making use of a plurality of like units, in that the manufacture is thereby greatly simplified and further in that individual units may be readily replaced when worn or damaged without the necessity of replacing the entire gear, thereby materially reducing the cost of replacements and repairs.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with yoke-acting means having spaced arms; of a plurality of transversely disposed friction elements within said yoke-acting means, said elements being arranged in pairs, the members of each pair having wedging engagement with each other to effect lateral relative movement thereof during compression of the mechanism and one of said members of each pair fitting between the yoke arms and being held against lateral movement in both directions by engagement with said arms; and spring means opposing lateral separation of said elements, one of said elements of each pair having frictional engagement with one of the elements of the next adjacent pair, said frictionally engaged elements being reversely movable through the wedging action during compression of the mechanism.

2. In a friction shock absorbing mechanism, the combination with a plurality of transversely disposed friction elements, said elements being arranged in pairs, the elements of each pair having wedging engagement with each other, one of said elements of each pair having a longitudinally disposed friction surface, and the elements of two adjacent pairs having frictional engagement with each other along transverse friction surfaces; of spring resistance means opposing relative movement of the elements of each pair; and a spring cap cooperating with each pair of elements and having a longitudinally disposed friction surface cooperating with the longitudinal friction surface of one of said elements and held against longitudinal movement with respect to the other element.

3. In a friction shock absorbing mechanism, the combination with a plurality of friction units, each unit including a pair of transversely disposed friction elements having wedging engagement with each other to effect lateral relative movement thereof during compression of the mechanism, said elements having longitudinally disposed, opposed abutment surfaces; of transversely disposed spring resistance means opposing relative lateral movement of said elements of each unit; and a spring cap interposed between said spring resistance of each unit and one of said longitudinally disposed abutment faces and having sliding frictional engagement with the latter, said cap abutting the other element and being held against movement lengthwise of the mechanism with respect to said last named element.

4. In a friction shock absorbing mechanism, the combination with a plurality of friction units, each unit including a pair of transversely disposed friction elements, said elements having wedging engagement with each other to effect lateral, relative movement thereof during compression of the mechanism, adjacent units being reversely arranged and having the adjacent elements thereof in frictional engagement along transversely disposed friction surfaces; of spring resistance means opposing relative movement of the elements of each unit; and yoke means within which said units are disposed and with which certain of said elements have longitudinal sliding frictional engagement.

5. In a friction shock absorbing mechanism, the combination with a plurality of pairs of transversely disposed friction elements, the elements of each pair having wedging engagement with each other to oppose relative movement thereof in a transverse direction; of yoke-acting means embracing said pairs of units, one of the members of each pair of elements being held against transverse movement by the yoke, and the other element being movable transversely with respect to the yoke, said movable element of each pair having frictional engagement with the movable friction element of the next adjacent pair along transverse friction surfaces and being movable reversely with respect to each other, the other element of each pair having a longitudinally disposed friction surface; spring resistance means opposing relative movement of the elements of each pair; and a friction plate bearing on said spring resistance and having longitudinal sliding contact with the longitudinally disposed friction surface of said element which is held against lateral movement.

6. In a friction shock absorbing mechanism, the combination with a yoke member; of a plurality of friction units within said yoke member, said units each including a pair of transversely disposed friction elements, one element of each pair being held against transverse movement by the yoke and having wedging engagement with the other element of said pair to effect transverse movement thereof, said last named element having a transverse abutment face and the other element having a longitudinally disposed friction surface opposed to said abutment face; a friction plate having longitudinal, sliding movement on said last named surface; and a spring resistance means interposed between said abutment face and said friction plate, opposing relative movement of the elements of said pair, the transversely, movable friction elements of adjacent pairs being in frictional contact and reversely movable with respect to each other.

7. In a friction shock absorbing mechanism, the combination with a yoke member; of a plurality of friction units within said yoke member, said units each including a pair of transversely disposed friction elements, one element of each pair being held against transverse movement by the yoke and having wedging engagement with the other element of said pair to effect transverse movement thereof, said last named element having a transverse abutment face and the other element having a longitudinally disposed friction surface opposed to said abutment face; a friction plate having longitudinal sliding movement on said last named surface; and spring resistance means interposed between said abutment face and said friction plate, opposing relative movement of the elements of said pair, said units being arranged in adjacent pairs, the units of each pair being reversely disposed and the movable elements of each pair of units having cooperating, transversely disposed friction surfaces and being reversely movable with respect to each other.

8. In a friction shock absorbing mechanism, the combination with a friction unit including a pair of transversely disposed friction elements having wedging engagement with each other to effect lateral relative movement thereof during compression of the mechanism, said elements having longitudinally disposed, opposed abutment surfaces; of transversely disposed spring resistance means opposing lateral relative movement of said elements; and a spring cap interposed between said spring resistance and one of said longitudinally disposed abutment faces and having sliding frictional engagement with the latter and being held against movement with respect to the other element in a direction lengthwise of the mechanism.

9. In a railway draft rigging, the combination with a yoke member having spaced, longitudinally disposed arm; of a friction unit disposed within the yoke between said arms, said unit including a pair of transversely disposed friction elements having wedging engagement with each other to effect lateral relative movement thereof during compression of the mechanism, said relative movement being limited upon full compression of the mechanism by said spaced yoke arms, said elements having longitudinally disposed, opposed abutment surfaces; a spring resistance between said abutment surfaces opposing relative lateral movement of said elements; and a combined spring cap and friction member interposed between said spring resistance and one of said longitudinally disposed abutment faces and having sliding frictional engagement with the latter.

In witness that I claim the foregoing I have hereunto subscribed my name this 15th day of January, 1930.

WILLIAM E. VAN DORN.